(12) United States Patent
Eckl et al.

(10) Patent No.: US 9,927,150 B2
(45) Date of Patent: Mar. 27, 2018

(54) STABILIZING SYSTEM

(71) Applicant: IDEEMATEC Deutschland GmbH, Wallerfing (DE)

(72) Inventors: Eduard Eckl, Wallerfing (DE); Johann Kufner, Aholming (DE)

(73) Assignee: IDEEMATEC DEUTSCHLAND GMBH, Wallerfing (DE)

( * ) Notice: Subject to any disclaimer, the term of this patent is extended or adjusted under 35 U.S.C. 154(b) by 84 days.

(21) Appl. No.: 14/443,664

(22) PCT Filed: Nov. 14, 2013

(86) PCT No.: PCT/EP2013/073832
§ 371 (c)(1),
(2) Date: May 19, 2015

(87) PCT Pub. No.: WO2014/076185
PCT Pub. Date: May 22, 2014

(65) Prior Publication Data
US 2015/0285536 A1 Oct. 8, 2015

(30) Foreign Application Priority Data
Nov. 19, 2012 (DE) .................... 20 2012 104 461 U

(51) Int. Cl.
*F24J 2/52* (2006.01)
*F16M 11/18* (2006.01)
(Continued)

(52) U.S. Cl.
CPC .......... *F24J 2/5241* (2013.01); *F16H 19/003* (2013.01); *F16M 11/18* (2013.01);
(Continued)

(58) Field of Classification Search
CPC .......... F24J 2/40; F24J 2/38; F24J 2002/5458; F24J 2002/5468; F24J 2/541;
(Continued)

(56) References Cited

U.S. PATENT DOCUMENTS 670,917 A    3/1901 Eneas
4,363,354 A * 12/1982 Strickland .................. F24J 2/02
                                                   126/573

(Continued)

FOREIGN PATENT DOCUMENTS

CN    202143005    2/2012
DE    60015950     11/2005
(Continued)

OTHER PUBLICATIONS

European Patent Office, International Search Report, dated Feb. 21, 2014.

*Primary Examiner* — Stanton L Krycinski
*Assistant Examiner* — Taylor L Morris
(74) *Attorney, Agent, or Firm* — Price Heneveld LLP

(57) ABSTRACT

A stabilizing system for stabilizing an arrangement for pivoting an elongate assembly plane extending along a longitudinal axis about an axis of rotation oriented along the longitudinal axis, comprising a first tension element and first and second base arrangements each including a deflecting element fixed on the assembly plane, and spaced apart from the axis of rotation to different sides, wherein the base arrangements are offset with respect to one another along the longitudinal axis, the base arrangements the first tension element, or a second tension element is connected the deflecting element to a fixed point and back at a first distance, and wherein the first tension element and/or the (Continued)

tension element is guided between the base arrangements along the longitudinal axis whereby a tension can be built up in the base arrangement.

15 Claims, 11 Drawing Sheets

(51) Int. Cl.
*F16H 19/00* (2006.01)
*F24J 2/54* (2006.01)
*H02S 20/10* (2014.01)
*H02S 20/30* (2014.01)
*F24J 2/38* (2014.01)
*H02S 20/32* (2014.01)
*F16M 11/10* (2006.01)
*H02S 20/00* (2014.01)

(52) U.S. Cl.
CPC ............ *F24J 2/5232* (2013.01); *F24J 2/541* (2013.01); *F16M 11/10* (2013.01); *F24J 2/38* (2013.01); *F24J 2002/5458* (2013.01); *F24J 2002/5468* (2013.01); *H02S 20/00* (2013.01); *H02S 20/10* (2014.12); *H02S 20/30* (2014.12); *H02S 20/32* (2014.12); *Y02E 10/47* (2013.01); *Y02E 10/52* (2013.01)

(58) Field of Classification Search
CPC ........ F24J 2/5424; F24J 2/5241; H02S 20/00; H02S 20/30; H02S 20/32; H02S 20/10; F16M 11/10; F16M 11/105; F16M 11/12; F16M 11/18; F16M 11/2021; F16M 11/2035; Y02E 10/47; Y02E 10/52
USPC ......... 248/122.1, 130, 133, 139, 141, 178.1, 248/179.1, 185.1, 371, 372.1, 393, 394, 248/395, 397; 108/1, 2, 3, 6, 7, 8; 126/573, 600, 605, 696, 606, 607, 571, 126/684; 250/203.1, 203.4, 491.1; 136/246, 248, 251, 245; 52/173.3
See application file for complete search history.

(56) References Cited

U.S. PATENT DOCUMENTS

| | | | | |
|---|---|---|---|---|
| 4,466,423 A * | 8/1984 | Dolan | ........................ | F24J 2/16 126/571 |
| 4,762,298 A * | 8/1988 | Wood | ..................... | F16M 11/12 126/573 |
| 4,832,001 A * | 5/1989 | Baer | .......................... | F24J 2/38 126/579 |
| 5,169,456 A * | 12/1992 | Johnson | ................... | F24J 2/085 126/607 |
| 5,325,844 A * | 7/1994 | Rogers | ....................... | F24J 2/10 126/600 |
| 6,091,016 A * | 7/2000 | Kester | ..................... | B64G 1/222 136/245 |
| 6,975,089 B2 * | 12/2005 | Rodnunsky | .............. | B66C 13/08 104/180 |
| 7,285,719 B2 * | 10/2007 | Conger | ................... | F24J 2/5241 136/245 |
| 8,274,028 B2 * | 9/2012 | Needham | ................. | F24J 2/541 126/573 |
| 8,399,759 B2 * | 3/2013 | Luo | ......................... | F24J 2/5424 136/246 |
| 2008/0168981 A1 * | 7/2008 | Cummings | ............ | F24J 2/5241 126/600 |
| 2009/0038672 A1 * | 2/2009 | Conger | ................... | F24J 2/5241 136/244 |
| 2009/0107542 A1 * | 4/2009 | Bender | ....................... | F24J 2/10 136/246 |
| 2009/0184223 A1 * | 7/2009 | Schwarze | ................ | F24J 2/045 248/237 |
| 2010/0108113 A1 * | 5/2010 | Taggart | ................... | E04F 10/08 135/96 |
| 2010/0147286 A1 * | 6/2010 | Xiang | .................... | F24J 2/5424 126/600 |
| 2010/0192942 A1 * | 8/2010 | Jones | ..................... | F24J 2/5427 126/602 |
| 2010/0258186 A1 * | 10/2010 | Harrenstien | ............ | F24J 2/145 136/259 |
| 2010/0294265 A1 * | 11/2010 | Baer | ...................... | F24J 2/5241 126/680 |
| 2010/0313500 A1 * | 12/2010 | Beck | ...................... | F24J 2/5232 52/173.3 |
| 2010/0314509 A1 * | 12/2010 | Conger | ................... | F24J 2/5241 248/121 |
| 2011/0067688 A1 * | 3/2011 | Reif | .......................... | F24J 2/06 126/600 |
| 2011/0208326 A1 * | 8/2011 | Dror | ......................... | F24J 2/38 700/71 |
| 2011/0290301 A1 * | 12/2011 | Erhart | ...................... | F24J 2/542 136/246 |
| 2011/0290306 A1 * | 12/2011 | Roberts | .................... | F24J 2/523 136/251 |
| 2012/0117890 A1 * | 5/2012 | Adell Argiles | ......... | E04B 7/163 52/1 |
| 2012/0180407 A1 * | 7/2012 | Rees | ........................ | E04C 3/08 52/173.3 |
| 2013/0068280 A1 * | 3/2013 | Luo | ........................ | F24J 2/5431 136/246 |
| 2013/0167912 A1 * | 7/2013 | Czaloun | ................. | F24J 2/5233 136/251 |
| 2013/0291926 A1 * | 11/2013 | Matalon | ..................... | F24J 2/14 136/246 |
| 2013/0305637 A1 * | 11/2013 | Alberto | .................. | F24J 2/5239 52/223.13 |

FOREIGN PATENT DOCUMENTS

| | | |
|---|---|---|
| JP | 2002134777 | 5/2002 |
| JP | 2002164559 | 6/2002 |
| WO | 2010005014 | 1/2010 |
| WO | 2010065941 | 6/2010 |
| WO | 2012034873 | 3/2012 |

* cited by examiner

STABILIZING SYSTEM

BACKGROUND OF THE INVENTION

The present invention relates to a stabilizing system, in particular for a tracking device for solar modules, as well as to a tracking device for solar modules.

If large-area structures, for example, plate-shaped structures having side lengths of several meters, are arranged pivotably, stability problems usually arise in this case. In order to achieve the mobility of large-area structures, these can be provided with arbitrarily many pillars, beams, struts or the like which certainly increase the stability of the arrangement but also increase its weight and therefore would reduce the mobility. On the other hand, such structures cannot be constructed so rigidly that the attachment of struts etc. can be completely dispensed with. An example for such large-area structures which must additionally be moved is, for example a tracking device for solar modules. In this case, a plurality of solar modules is arranged in a row on an assembly plane, consisting, for example, of transverse members, longitudinal members etc. along a longitudinal axis. In order to ensure optimal solar irradiation, the solar modules are arranged so that they can track the sun or be pivoted about a longitudinal axis or an axis of rotation. As a result of the large dimensions of such installations and the wind loads which occur, the material and structural expenditure for such systems is extremely high. Thus, it can be extremely problematical for the operational stability if the assembly plane with the solar modules becomes warped or the like in gusts of wind. In addition, strong drive motors are required to pivot the solar modules.

It is therefore the object of the present invention to provide a stabilizing system for stabilizing an arrangement for pivoting an elongate assembly plane extending along a longitudinal axis about an axis of rotation oriented along the longitudinal axis and for transmitting a rotary movement along the longitudinal axis, as well as a tracking device for solar modules.

SUMMARY OF THE INVENTION

According to the invention, the stabilizing system for stabilizing an arrangement for pivoting an elongate assembly plane extending along a longitudinal axis about an axis of rotation oriented along the longitudinal axis, in particular a tracking device for solar modules, comprises at least one tension element, in particular a cable arrangement, a compensating arrangement and at least two base arrangements, wherein a first base arrangement comprises a deflecting element which is arranged on the assembly plane spaced apart from the axis of rotation to one side, wherein a second base arrangement comprises a deflecting element which is arranged on the assembly plane spaced apart from the axis of rotation to another side, and wherein the first and the at least one second base arrangement are offset with respect to one another along the longitudinal axis, wherein in the base arrangements the tension element is guided from the deflecting element in each case to a fixed point and back at a first distance and wherein the tension element is guided between the base arrangements along the longitudinal axis whereby a tension can be built up in the base arrangement so that at least two base arrangements are connected by the tension element in such a manner that in the case of a pivoting of the assembly plane the first distance of the one base arrangement is shortened when the first distance of the at least one other base arrangement is lengthened, wherein the shortening and the lengthening are different in such a manner that a length difference is formed which influences the tension of the tension element, wherein the compensating arrangement is attached to the first base arrangement and comprises a compensating element which is arranged rotationally fixed with respect to the assembly plane, wherein the tension element is guided from the fixed point of the first base arrangement further to the compensating element and back at a second distance so that the length difference can be compensated by means of a variation of the second distance, whereby the tension in the at least two base arrangements can be adjusted.

In the invention the assembly plane is thus stabilized by one or more tension elements, in particular cables, which act at various points along the assembly plane and connect this to at least one non-pivotable fixed point. Since a tension always prevails on the tension element(s), the assembly plane is, for example, stabilized against twisting about the longitudinal axis during pivoting or in gusts of wind. As will be explained in further detail below, the compensating arrangement serves to compensate the length variations of the tension element(s) which occur during pivoting in order to keep the tension on the tension element(s) always at least substantially constant regardless of the pivot position.

The tension element or the additional tension elements are preferably formed by chains, cables, in particular wire cables, wires or other tensioning elements.

The deflecting elements which are each arranged to a base arrangement are preferably attached to the pivotable assembly plane, expediently to the underside thereof, spaced apart from the axis of rotation as far as possible, e.g. by about 50-80 cm with a width of the cross beam of about 100-180 cm. As a result, the tension element can be guided from the deflecting element in each case to a fixed point which is firmly connected to the ground. The fixed point can, for example, lie on a post which supports the assembly plane. Typically a row of posts arranged along the longitudinal axis are provided. Furthermore the assembly plane preferably comprises a plurality of transverse members or cross beams which are arranged offset at a distance from one another along the longitudinal axis and transversely thereto. In particular each cross beam is mounted on a post via a pivot point or a bearing. The cross beams are preferably connected by longitudinal members which run along the longitudinal axis, e.g. on both sides of the axis of rotation and therefore span the assembly plane. In this embodiment it is advantageous if the deflecting elements are each arranged on the cross beams so that each base arrangement is attached to a cross beam and optionally to the approximate post. A plurality of base arrangements can also be arranged on one cross beam. The invention is however not restricted to this embodiment of the assembly plane with cross beams.

Preferably the first base arrangement is arranged on a first cross beam, the deflecting element thereof being spaced apart from the axis of rotation towards one side. The second base arrangement is arranged offset by one or more cross beams further along the longitudinal axis, the deflecting element thereof being attached on the assembly plane spaced apart from the axis of rotation towards the other side. The assembly plane is thus diagonally stabilized by means of a pull on the tension element. As will be explained in further detail below, preferred stabilizing systems additionally contain at least two further base arrangements whose deflecting elements are each arranged in a mirror-inverted manner to the first and second base arrangement in order to stabilize the other diagonals.

The first and second base arrangement each comprise a deflecting element and a fixed point. They differ however in that the first base arrangement is attached to the compensating arrangement whilst the second base arrangement is not. Here "attached" means that the tension element which is guided from the deflecting element to the fixed point of the first base arrangement is not immediately guided back again to the deflecting element but is firstly guided further to the compensating element before it is guided back to the deflecting element via the fixed point of the first base arrangement.

From the deflecting element of the first base arrangement, the tension element is now expediently guided to a deflecting roller which is preferably guided in the region of the axis of rotation of the first post. The deflecting roller fulfils the purpose of guiding the tension element along the longitudinal direction to the cross beam on which a deflecting roller is also attached approximately at the centre. From these the tension element is guided in the direction of the deflecting element of the second base arrangement. From the deflecting element of the second base arrangement it goes to the fixed point of the second base arrangement and from there back to the deflecting element of the second base arrangement on which the tension element is finally fixed. The first distances are measured between the deflecting elements and the fixed points. The first distances can naturally have different lengths despite their identical designation.

Preferably the first distances are approximately equal if the assembly plane is approximately horizontal or perpendicular to the posts. This position is subsequently also called central position. Since the tension element is connected to the one and the other side of the assembly plane, the lengths of the first distances vary however in the case of a pivoting of the assembly plane in such a manner that, for example, the first distance of the first base arrangement is shortened when the first distance of the second base arrangement is lengthened and conversely.

Preferably the distances or radii of the deflecting elements of the various base arrangements from the axis of rotation are selected to be the same or at least approximately the same. Likewise the fixed points at the posts are advantageously arranged the same in such a manner that the first distances are approximately the same size when the assembly plane is horizontal or perpendicular, i.e. in the central position, to the posts.

If the assembly plane is now pivoted in such a manner that the first distance of the first base arrangement is shortened, the first distance of the second base arrangement is lengthened. The tension element in the region of the first distance of the second base arrangement tends to be tensioned by this lengthening whilst the tension element in the region of the first distance of the first base arrangement is unloaded, i.e. tends to lose the tension. The tension in the tension element is however required to stabilize the assembly plane. The tension element can certainly slide over the deflecting elements and the deflecting rollers. That is, if so to speak the deflecting element of the second base arrangement is moved upwards and thus the first distance of the second base arrangement is lengthened, the "cable length" required for this comes from the direction of the shortening base arrangement. However, the lengthening and the shortening of the tension element are not exactly the same.

In order to now re-establish the tension in the tension element and in particular in the shortening distances of the base arrangement(s), the compensating arrangement is provided.

For this purpose the compensating element is arranged rotationally fixed with respect to the assembly plane at a second distance from the fixed point. Preferably its position is selected so that in the central position of the assembly plane the second distance is minimal. An imaginary line between the fixed point and the compensating element preferably lies perpendicular to the assembly plane in the central position. From the pivot point or the axis of rotation the compensating element is advantageously spaced apart in a torque-proof manner in a radius. The length of the second distance therefore varies, i.e. the distance between the compensating element and the fixed point, automatically when the assembly plane is pivoted. The length of the second distance becomes increasingly greater when the assembly plane is pivoted out from the described central position, no matter to which side.

An extension of the second distance therefore means an increase in tension in the tension element since this is guided around the compensating element. If the assembly plane is pivoted from the central position, a "pull" is made on the tension element so to speak by the compensating element.

The aforesaid length difference which occurs in the case of a pivoting of the assembly plane can thus be compensated by the fact that the lengthening of the first distance of the second base arrangement is not as great as the shortening of the first distance of the first base arrangement (or conversely).

Preferably the distance of the compensating element from the axis of rotation or the radius is designed in such a manner that the lengthening of the second distance is such that the length difference and therefore the loss of tension in the tension element in the case of the pivoting of the assembly plane is completely compensated.

Advantageously a first base arrangement is arranged on the other side of the first cross beam. This can advantageously use the fixed point already provided on the post as well as the compensating arrangement located on the first cross beam. Likewise, a second base arrangement can be arranged on the other side of the second cross beam, which can use the fixed point already provided on the second post. The two last-mentioned base arrangements are connected via a (new) tension element. The assembly plane is therefore advantageously stabilized at least at four points, two on each side of the axis of rotation.

Preferably a plurality of second base arrangements is arranged on both sides of the longitudinal axis and along this in order to stabilize the assembly plane at as many points as possible. In order to keep the structure as simple as possible, it is preferable to connect a plurality of second base arrangements in each case to a single first base arrangement. In this way, only one compensating arrangement is required which is in each case arranged on the first base arrangement.

In this case, the tension element can be guided in two directions of the longitudinal axis to possible further second base arrangements. Advantageously one first base arrangement cooperates with a plurality of further second base arrangements whereby a distributor element is provided on the tension element which is connected to the first base arrangement, a plurality of additional tension elements being fastened on said tension element, which each lead to further base arrangements which are spaced apart from one another along the longitudinal axis. A plurality of first base arrangements can also be used for one assembly plane.

It should be mentioned that the assembly plane comprises a substantially flat or plate-shaped structure. The term "assembly plane" should not be interpreted to mean that it comprises a completely flat or straight surface. Wavy or angular structures or the like are also feasible. The crucial thing is that the assembly plane claims a large area compared to its height.

Preferably the deflecting element, the compensating element and/or the fixed point each comprise one or more deflecting roller(s) each having at least one guide groove. Preferably each deflecting roller has only one guide groove. Advantageously two different base arrangements can include the same fixed point or the compensating element can be connected to a plurality of tension elements. For this purpose, deflecting element, compensating element and fixed point preferably comprise each as many deflecting rollers as necessary to repeatedly deflect the tension element at them. A preferred diameter of the deflecting rollers for the compensating element is about 5 to 7 cm. The fixed point preferably includes four deflecting rollers, the deflecting elements each include one or two. Alternatively deflecting element, compensating element and/or fixed point can also each comprise a deflecting roller with a plurality of guide grooves.

Further preferably the deflecting element is designed both for deflecting the tension element and also as the starting and/or end point of the tension element. As has already been described, the tension element preferably begins at the deflecting element of the first base arrangement and is guided from there via the fixed point to the compensating element from where it is guided back to the fixed point and to the deflecting element of the first base arrangement in order to be guided from there further to the second base arrangement. The deflecting element therefore fulfils the function of deflecting the tension element in the direction of the axis of rotation of the assembly plane.

Preferably the deflecting element additionally serves as starting or end point of a tension element. To this end the tension element can have a loop at the end which is placed around the deflecting element in such a manner that no deflection is made. Alternatively preferably the tension element can also be fastened separately, e.g. on the assembly plane or on the cross beam, for example, by means of a screw and/or clamping connection. The starting and end point of the tension element as well as the passing on position therefore optionally do not fall directly upon one another.

Expediently the compensating element is arranged approximately at right angles to the assembly plane (or to the cross beam) from the axis of rotation at a third distance. Since the compensating element is arranged in a torque-proof manner over the third distance from the pivot point or the axis of rotation, it moves in a radius during the pivoting of the assembly plane.

Advantageously the strength of the tension compensation by the compensating arrangement can be varied by means of the distance or radius between the compensating element and the axis of rotation. The longer the distance or the radius between the compensating element and the assembly plane is selected, the greater is the length difference which can be compensated. Preferably the distance of the compensating element from the axis of rotation is about 15 to 35 cm, particularly preferably about 20 to 30 cm, especially particularly preferably about 24 to 26 cm.

Preferably a ratio of the distance of the deflecting element from the axis of rotation to the distance of the compensating element from the axis of rotation lies in a range from about 1 to 4, particularly preferably at about 1.5 to 3, especially particularly preferably at about 1.8 to 2.5.

Preferably a ratio of the distance of the deflecting element from the axis of rotation to the distance of the fixed point from the axis of rotation lies in a range from about 0.6 to 1.4, particularly preferably at about 0.7 to 1.3, especially particularly preferably at about 0.8 to 1.2.

Since a plurality of base arrangements can be arranged along the assembly plane, the stability can be increased still further. Advantageously the length differences of a plurality of base arrangements are compensated by means of one compensating arrangement. Advantageously therefore a plurality of length differences can be compensated by the compensating arrangement whereby the plurality of length differences can be transmitted via the distributor element to the tension element, which is connected to the compensating arrangement, in other words therefore the tension element of the first base arrangement. Advantageously therefore an entire assembly plane can therefore be compensated with only one compensating arrangement.

In a preferred embodiment the cross beams are connected along the longitudinal axis via at least two longitudinal members. Again in a preferred embodiment module carrier rails are arranged on the longitudinal members which in turn are used for fastening solar modules. Overall the arrangement consisting of solar modules, the module carrier rails, the longitudinal members and the cross beams can be considered as the assembly plane which is pivotable about the axis of rotation.

The solar modules can be arranged differently oriented. That is, it is irrelevant whether the usually rectangular solar modules are aligned with their longer side along the longitudinal axis or transverse thereto. Likewise, a plurality of solar modules, preferably for example, two solar modules can be arranged transversely to the longitudinal axis. Preferably the already-mentioned module carrier rails are used for this purpose. Further preferably the solar rails can also be arranged differently oriented along the longitudinal axis or also variously large solar modules can be arranged. The said also applies to solar modules which are attached directly on the longitudinal members, for example, by means of clamps or the like.

Preferably the cross beams are configured as U profiles where the longitudinal members are arranged on one of the flange sides, preferably on the upper flange. The longitudinal members are in turn preferably configured as square profiles which are fastened by means of suitable fastening elements, for example, U-shaped clips, to the flanges of the cross beams. In order to be able to present very long longitudinal members of 50 m and more, these are preferably fabricated as longitudinal member parts which are expediently seamlessly interconnected to one another by means of intermediate pieces.

The cross beams and the longitudinal members are preferably made of steel, in particular of galvanized steel. The module carrier rails are additionally arranged preferably at approximately regular intervals between the substantially parallel-running cross beams, which are preferably designed to further stiffen the entire structure, i.e. the assembly plane. Preferred materials for the module carrier rails are aluminium or steel, in particular galvanized steel. The module carrier rail can preferably be designed so that the standard fastening holes of the solar modules can be used. The solar modules are preferably fastened to the module carrier rails by means of screws and/or rivet connections, where the use of rivets constitutes an additional anti-theft measure.

Preferably the cross beams are each indirectly and/or directly connected or mounted to a post via pivot points aligned along the axis of rotation. The post preferably comprises profiles made of metal, particularly preferably double-T beams. The preferred material here also is steel, in particular galvanized steel.

In a preferred embodiment the posts have a top part by which means the cross beam can be fastened to the post. Advantageously the top part is arranged adjustably along a vertical axis of the post, for example, by means of corresponding oblong holes in the top part. The connection to the posts is preferably made by means of one or more screw connections. The top part further preferably comprises the pivot point at which the cross beam can be arranged.

Particularly preferably an adapter plate is arranged between the top part and the cross beam. This enables the centre of gravity of the assembly plane to be lowered whereby the cross beams can preferably be positioned lower than the axis of rotation by means of the adapter plates. It is thereby achieved that when pivoting the assembly plane, its centre of gravity acts on the post or posts with the lowest possible lever arm in order to keep its loading and also the loading of the foundations as low as possible. In a preferred embodiment the arrangement of the cross member on the posts is therefore made via the top part and the adapter plate which are preferably both designed to be one-piece.

Preferably the pivot point comprises a bearing which allows a rotary movement not only about the axis of rotation but which also allows a movability about the vertical axis (of the post) at least to a limited extent. Together with the height-adjustable top part, position differences along the longitudinal axis between a plurality of posts can therefore be compensated so that the arrangement of the pivot points of a plurality of posts along the axis of rotation or along the longitudinal axis can be aligned very accurately. Also an adaptation can be made very easily in the case or rough or difficult ground conditions. The top part and the adapter plate are also preferably made of steel, in particular made of galvanized steel.

Expediently a row of posts is arranged along the longitudinal axis, wherein a main post is provided which comprises a drive element which is designed to pivot the cross beam of the main post and consequently the assembly plane about the longitudinal axis. Preferably the main post is configured exactly the same as the other posts. Instead of a top part, however the main post has a support structure at its upper end, which is arranged on this, also adjustably along a vertical axis of the main post, for example, by means of oblong holes. The arrangement of the support structure like that of the top part is preferably made on the web of the main post or the post. The support structure is used to arrange the drive element. From the drive element the torque is transmitted to the cross beam of the main post which is required to pivot the entire assembly plane around the axis of rotation. The support structure is preferably made of steel, in particular of galvanized steel.

Expediently the fixed points are arranged on the main post or the post on which a base arrangement is arranged. The arrangement of the fixed point on the post or posts or on the main post is preferably accomplished on webs thereof when these are configured as double T-beams. In the row of posts it is not necessary that each post or each cross beam is connected to a tension element or additional tension elements.

In this case, the tension element or the additional tension elements can expediently be simply guided further.

Advantageously the compensating arrangement and two first base arrangements each having one tension element are arranged on the cross beam of a post, e.g. of the main post, wherein the tension elements are guided via deflecting rollers from the main post along the longitudinal axis and at their ends are each provided with the distributor element so that the tension elements can be connected via further tension elements to a plurality of base arrangements. Expediently the number of further tension elements connected to the distributor elements corresponds to the number of second base arrangements which each lead onto the one or the other side of the longitudinal axis, wherein the further tension elements connected to the distributor element are guided in such a manner to the second base arrangements that the first distances thereof are shortened when the first distance of the respective tension element at the main post is lengthened and conversely.

Advantageously deflecting rollers are provided for guiding the further tension elements to the base arrangements, which rollers are designed both for a deflection of the tension elements transversely and also in the direction of the longitudinal axis. In principle, the structure of the stabilizing system with deflecting rollers and tension elements or further tension elements brings with it the advantage that the entire installation or the entire assembly plane so to speak aligns itself since the forces which occur (weight forces and also drive forces through the drive element) are transmitted ideally along the longitudinal axis and transversely thereto and distributed immediately.

Advantageously the distributor element has an anti-twist device. This has the advantages that the further tension elements do not turn or twist. Preferably wire cables having a diameter from about 2 to 8 mm, particularly preferably having a diameter from about 4 to 5 mm, are used as tension elements or as further tension elements. Such wire cables are made from braids which are twisted approximately in a spiral manner to form the actual wire cable. Under tensile stress, this spiral arrangement has the result that the wire cable would twist. With the arrangement of a plurality of wire cables on the distributor element, the wire cables would therefore twist into one another or tend to twist the distributor element (by applying a torsional moment).

The distributor element is preferably configured as a plate on which the tension element and the further tension elements are arranged along the longitudinal axis wherein the plate comprises a guide hole through which an auxiliary cable is guided in such a manner that a twisting of the plate about the longitudinal axis is prevented whereby the anti-twist device is provided. The arrangement of the auxiliary cable or plurality of auxiliary cables in the guide hole has the result that the distributor element or the plate can no longer twist under application of the torque or the torsional moment by the further tension elements. The torsional moment is so to speak absorbed by the auxiliary cable which is guided through the guide hole. The plate is supported so to speak via the guide hole on the auxiliary cable. The auxiliary cable can be tensioned at more or less arbitrary points along the longitudinal axis. Preferably the auxiliary cable is provided with at least one tensioning element. Preferably a plurality of anti-twist devices or distributor elements provided with the anti-twist device are arranged on an auxiliary cable.

Preferably a plurality of rows of tracking devices for solar modules which are each equipped with stabilizing systems according to the invention are arranged substantially parallel to one another where preferably only one drive element is provided for each row. Preferably the rows are 30, 40, 50 m long and also longer. It is understood that the rows need not all have the same length. Embodiments are feasible in which a plurality of rows of tracking devices for solar modules are driven by means of a single drive element.

Advantageously the drive element comprises a motor and a transmission, in particular a worm drive, wherein the torque of the drive element can be transmitted via a transmission element to the movable element, wherein the compensating element is arranged on the transmission element.

The transmission element is preferably fabricated as a flat plate made of steel sheet, particularly preferably of galvanized steel sheet. Preferably at least one deflecting roller can be arranged on the transmission element. Advantageously two deflecting rollers are provided for relaying the tension elements in the direction of the longitudinal axis. Also the cross beam is preferably connected in a torque-proof manner, for example, by means of a welded connection. The same applies to the compensating element which is also preferably arranged on the transmission element. The form of the transmission element and the arrangement of the compensating element thus expediently form the compensating arrangement since by means of the arrangement on the transmission element and its position with respect to the axis of rotation, the compensating element implements the distance of the compensating element from the axis of rotation and its torque-proof arrangement which are necessary for the operating mode of the compensating arrangement. In a preferred embodiment the transverse member is arranged on the main post therefore via the transmission element which is connected to the drive element, where the drive element is arranged on the main post via the support structure.

The worm drive preferably has a self-retention and enables a very precise adjustment of the entire assembly plane. Preferably the use or the deployment of the stabilizing system allows the use of small electric motors compared to the tracking devices for solar modules known from the prior art since the tension elements or the additional tension elements ideally relay the forces introduced via the drive element into the assembly plane along the longitudinal axis (in both direction) and transversely thereto.

Advantageously the tension element, the further tension elements and/or the auxiliary cable comprise at least one tensioning element. Preferably the stabilizing system can be readjusted or adapted to different weather condition by the tensioning elements.

Thus the tension elements or the further tension elements can be lengthened or shortened where they have been in operation for a certain time or when they are exposed to severe temperature fluctuations. The application of an additional tension when strong wind conditions threaten is also feasible.

According to the invention a tracking device for solar modules comprises a stabilizing system according to the invention.

Further advantages and features are obtained from the following description of preferred embodiments of the stabilizing system according to the invention as well as the tracking device according to the invention with reference to the appended figures. Individual features of the individual embodiments can be combined with one another within the framework of the invention.

DETAILED DESCRIPTION OF THE PREFERRED EMBODIMENTS

Figure 1:
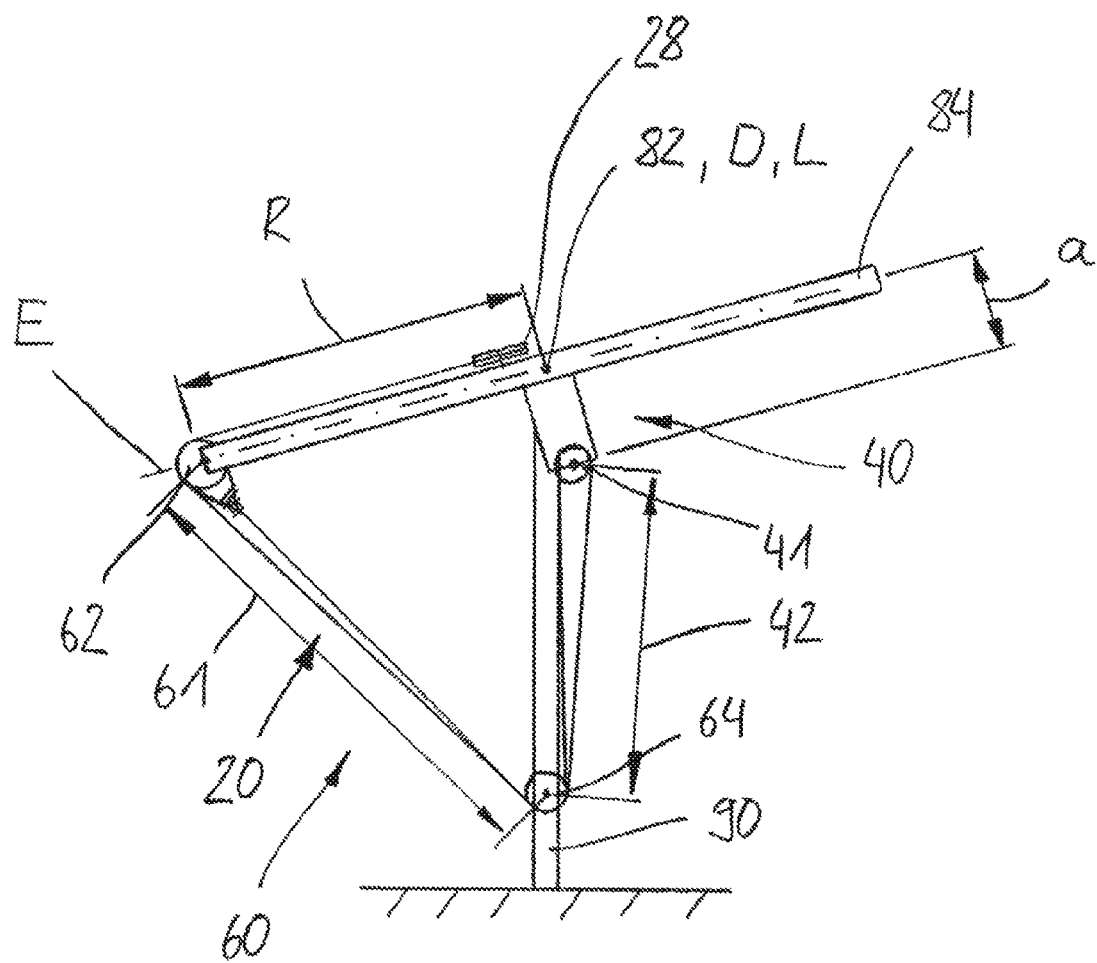
FIG. 1: shows a preferred embodiment of a stabilizing system seen in a schematic view transverse to the longitudinal axis

FIG. 1 shows a preferred embodiment of a stabilizing system in a viewing direction transverse to a longitudinal axis L. This shows a post 90 anchored in the ground, at the upper end whereof a cross beam 84 is pivotally mounted by means of a pivot point 82. A first base arrangement 60 is arranged on the cross beam 84. This comprises a deflecting element 62 which is arranged on the left outer edge of the assembly plane E and therefore on the left outer edge of the cross beam 84. The deflecting element 62 here comprises two deflecting rollers each of which has a guide groove. A first deflecting roller forms the end point of a tension element 20 (here a cable) which forms a loop around the first deflecting roller of the deflecting element 82. From there the cable 20 is guided to a fixed point 64 which is also formed by a plurality of deflecting rollers which are fixed to the post 90 relatively close to the ground. From one of the rollers of the fixed point 64 the cable 20 is guided further to a compensating arrangement 40, here in particular to a compensating element 41. This is in turn configured as a deflecting roller and is attached on a side arm projecting downwards below the pivot point 82 on the cross beam 84 and therefore on the assembly plane E. From the compensating element 41 the tension element 20 is guided back via a second roller of the fixed point 64 and from there back to the second roller of the deflecting element 62 from where it is guided parallel to the cross beam 84 to a deflecting roller 28. This now deflects the cable direction from the plane of the paper parallel to the longitudinal axis. In this way, the cable 20 is guided further to a second base arrangement, not visible in FIG. 1. The second base arrangement has no compensating arrangement 40 but is constructed at least substantially mirror-inverted to the first base arrangement, in particular the deflecting element 62 is fixed on the right side of the cros beam 84.

The compensating element 41 is arranged at a distance a from the assembly plane E and furthermore intersects the connecting line drawn at right angles to the assembly plane E between the assembly plane E and the compensating element 41, the axis of rotation D. The distance from the deflecting element 62 to the axis of rotation D on the other hand is denoted by radius R.

Figure 2A:
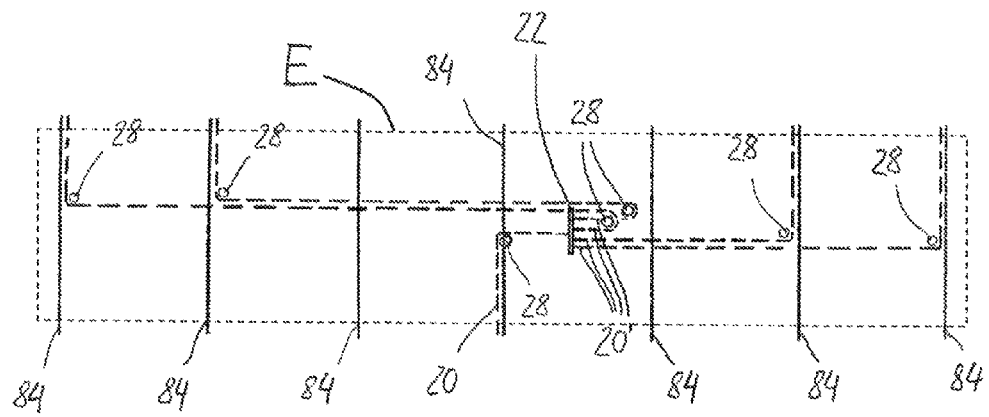
FIG. 2a: shows a plan view of a preferred embodiment of an assembly plane with the focus on the course of the tension element which is connected to further tension elements.

FIG. 2a shows a plan view of a preferred embodiment of an assembly plane E with the focus on the course of the tension element 20 which is connected to further tension elements 20'. Depicted are seven adjacently arranged cross beams 84 which are each rotatably mounted on posts 90 (not visible) which, for example, have their foundations in the ground. At the central cross beam 84 the tension element 20 is guided via a deflecting roller 28 in the direction of a longitudinal axis L or an axis of rotation D to the right. A distributor element 22 is arranged at the end of the tension element 20. Four further tension elements 20' are arranged on the distributor element 22, of which two are guided further to the right as lengthening of the tension element 20 and of which two are guided via deflecting rollers 28 to cross beams 84 onto the left side. FIG. 2a shows two cross beams 84 which are not connected to the tension element 20 or the further tension elements 20'. In this way, it is possible to connect a single first base arrangement, here arranged on the central cross beam 84, where its deflecting element 62 is fastened in the plane of the paper below the longitudinal axis on the cross beam 84, to four second base arrangements 60', whose deflecting element 62 is located above the longitudinal axis. As a result, an appreciable stiffening or stabilization of the assembly plane is already achieved.

Figure 2B:
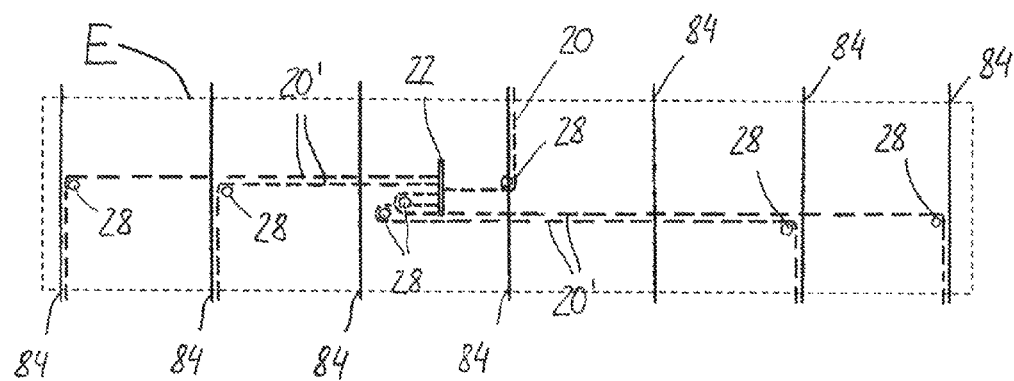
FIG. 2b: shows a plan view of the preferred embodiment of the assembly plane and the course of another tension element and other further tension elements connected thereto.

FIG. 2b shows the arrangement already known from FIG. 2a, mirrored about the longitudinal axis. FIGS. 2a and 2b should actually be placed one above the other and are only shown separately for clarity. The central cross beam 84 therefore has a second tension element 20 which when viewed with respect to the axis of rotation D is arranged in a mirror-inverted manner on the central cross beam 84. The course of the further tension elements 20' accordingly corresponds to that from FIG. 2a. As a result, it is achieved through the two part stabilizing systems of FIGS. 2a and 2b that the assembly plane is stabilized at ten different points with the aid of two cable arrangements.

Figure 3A:
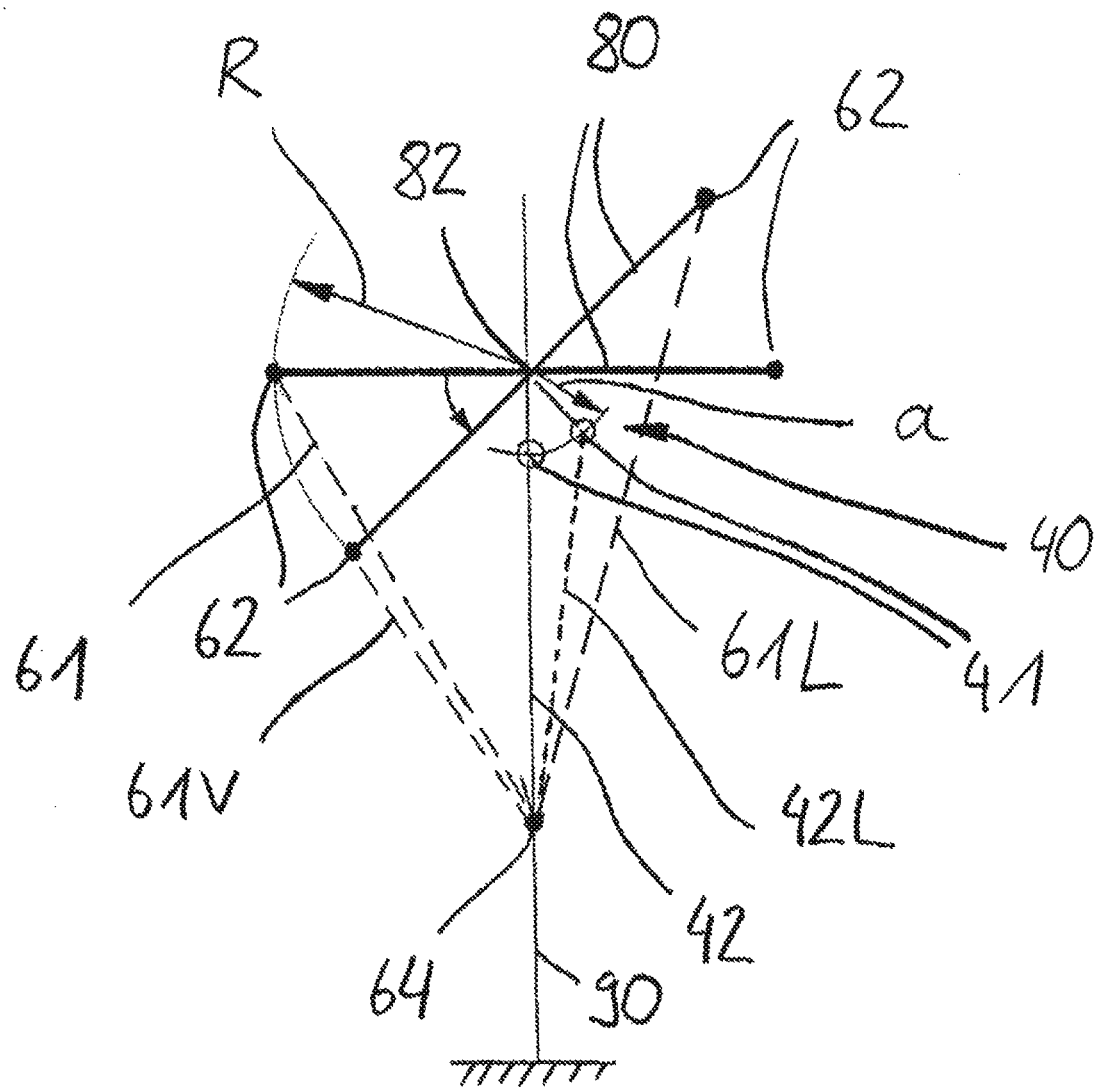
FIG. 3a: shows a schematic drawing for the operating mode of a preferred embodiment of a stabilizing system.

FIG. 3a shows a schematic view of a stabilizing system having a cross beam 84 or on an assembly plane E which is connected via a pivot point 82 to a post 90. The assembly plane E (or the cross beam 84) has a deflecting element 62 at a radius R on both sides of the pivot point 82 or an axis of rotation D. These typically belong to different (one first and one second) base arrangements and are therefore usually arranged on different cross beams but are interconnected by means of one and optionally further tension elements. A fixed point 64 is arranged at the post 90. The assembly plane E further comprises a compensating arrangement 40 with a compensating element 41. The compensating element is arranged in a torque-proof manner on the assembly plane E at a distance a starting from the pivot point 82. The assembly plane E is shown in two positions. Initially in a horizontal position (cf. central position) and further in a position twisted counter-clockwise. In the central position a first distance 61 can be measured between the deflecting elements 62 and the fixed point 64. A second distance 42 is measured between the compensating element 41 and the fixed point 64. In the twisted position a shortened first distance 61V is now measured between the deflecting element 62 and the fixed point 64 on the left side of the axis of rotation D. A lengthened first distance 61 L can be measured on the right side of the axis of rotation D. The total of the two first distances 61V+61L has however changed compared with the original total 2×61. Since the tension element is not sufficiently elastic in order to compensate for this change, this results in a loss of tension in the tension element(s) which would result in a loss of the stabilizing function of the cable construction. For this reason the tension element is additionally guided over the compensating element 41 where the second distance 42L has lengthened during the pivoting. The distance a should be designed in relation to the radius R in such a manner that the tension in the tension elements required for stabilization is maintained in each twist position of the assembly plane E.

Figure 3B:
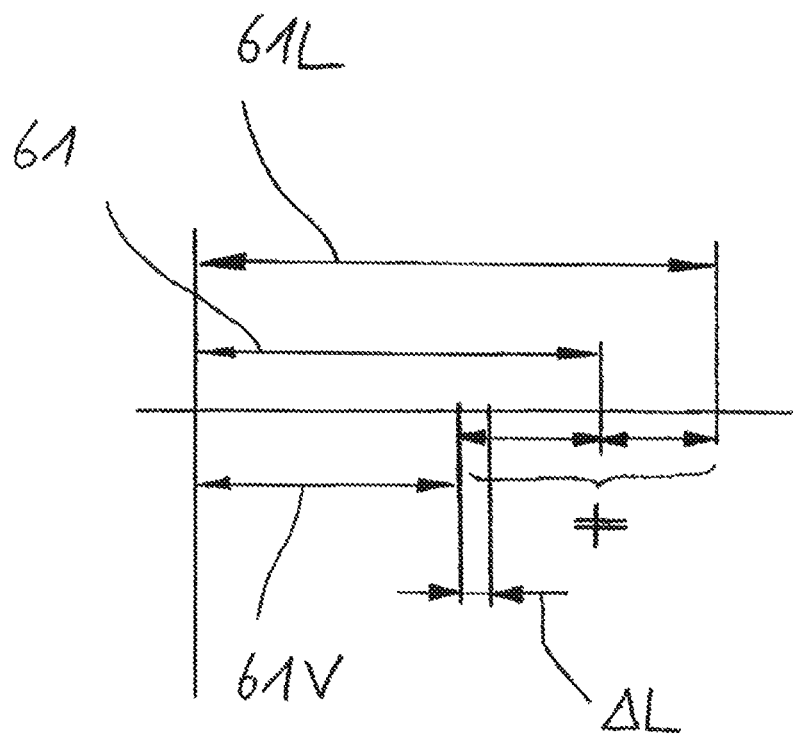
FIG. 3b: shows a schematic drawing to illustrate the length ratios in the preferred embodiment of the stabilizing system.

FIG. 3b illustrates this relationship schematically by showing the length of the first distance 61 in the central position as well as the shortened first distance 61V and the lengthened first distance 61L above one another. Here it is clear that, starting from the first distance 61 the length variation which results in the shortened first distance 61V, does not exactly correspond to the length variation which result in the lengthened first distance 61L. There remains a length distance ΔL which has the result that the tension of the tension element 20 decreases. FIG. 3a also shows however that during the twisting of the assembly plane E the second distance 42 is lengthened to the extent of a lengthened second distance 42L.

Figure 3C:
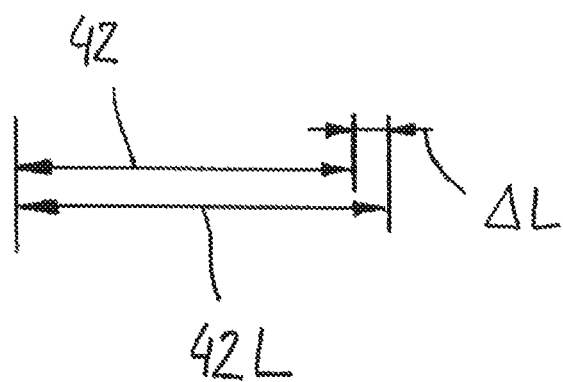
FIG. 3c: shows another schematic drawing to illustrate the length ratios in the preferred embodiment of the stabilizing system.

As FIG. 3c illustrates schematically, the length difference ΔL can thereby be compensated since expediently the lengthening of the second distance 42 corresponds or corresponds as exactly as possible to the length difference ΔL.

Figure 4:
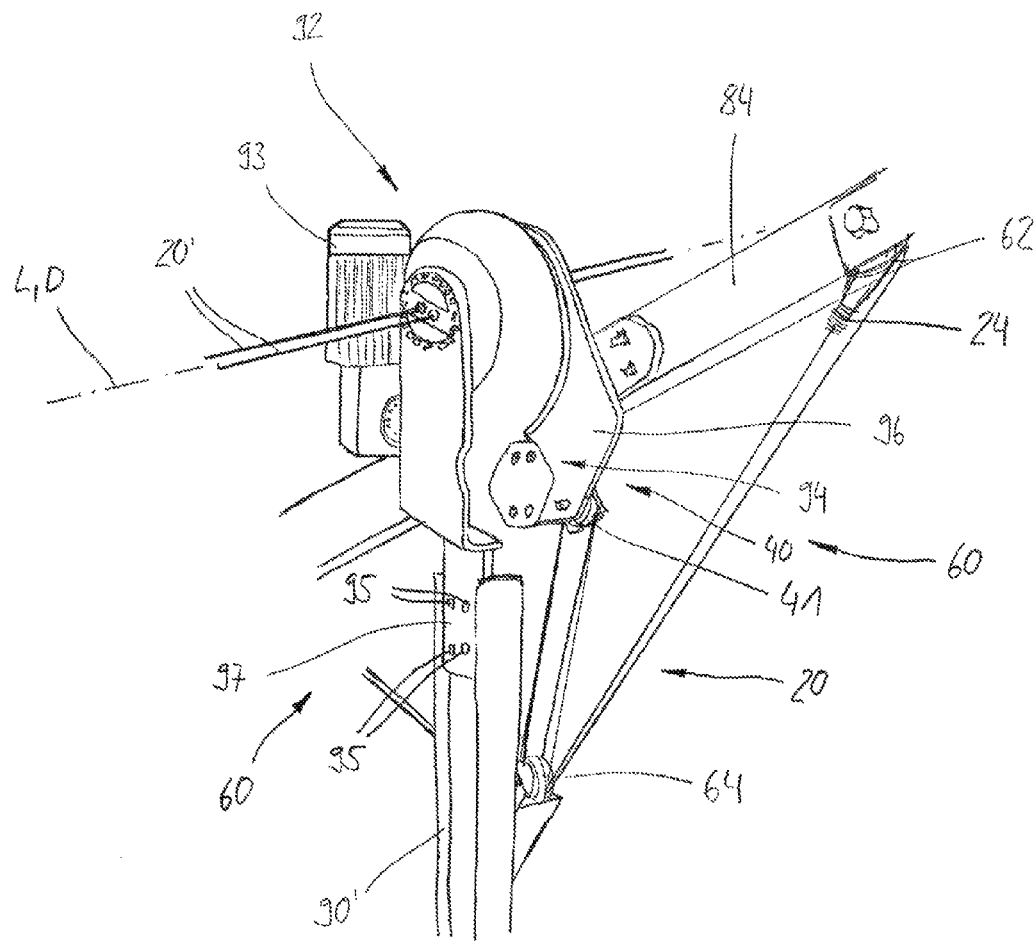
FIG. 4: shows a perspective view of a preferred embodiment of a main post.

FIG. 4 shows a perspective view of a preferred embodiment of a main post 90'. A fixed point 64 is arranged in the central to lower region of the main post 90'. Starting from the fixed point 64 tension elements 20 each lead to two deflecting elements 62 at both ends of a cross beam 84 and to a compensating element 41. The compensating element 41 is part of a compensating arrangement 40 which substantially results from the fact that the compensating element 41 turns about an axis of rotation D at a distance a (not shown in FIG. 4). The compensating element 41 is arranged on a transmission element 96 which transmits the torque from a drive element 92 onto the cross beam 84. The drive element 92 comprises an electric motor 93 and a worm drive 94. The entire drive element 92 is fastened by means of a support structure 97 which has oblong holes 95 on the main post 90', for example by means of screws. As a result of the oblong holes 95 an adjustment along the vertical axis of the main post 90' is possible. The support structure 97 or the drive element 92 has holes, here without reference numbers, in order to guide further tension elements 20' along a longitudinal axis L which extends substantially along the axis of rotation D. Starting from the drive element 92, a torque can be transmitted via the transmission element 96 onto the cross beam 84 whereby the cross beam 84 and thus the two deflecting elements 62 are each pivoted about the axis of rotation D. Consequently both the first distances 61 (not shown in FIG. 4 for clarity) of the first base arrangements 60 which are each connected to the fixed point 64 are shortened or lengthened in their length. The tension element 20 of the right first base arrangement 60 is fastened by means of a tensioning element 24 on the deflecting element 62 or begins there before it is guided via the fixed point 64 to the compensating element 41 and from there back via the fixed point 64, to the deflecting roller 62 and then further along the arrangement. As best illustrated in FIGS. 1 and 4, the tensioning element 20 may comprise a spring element.

Figure 5:
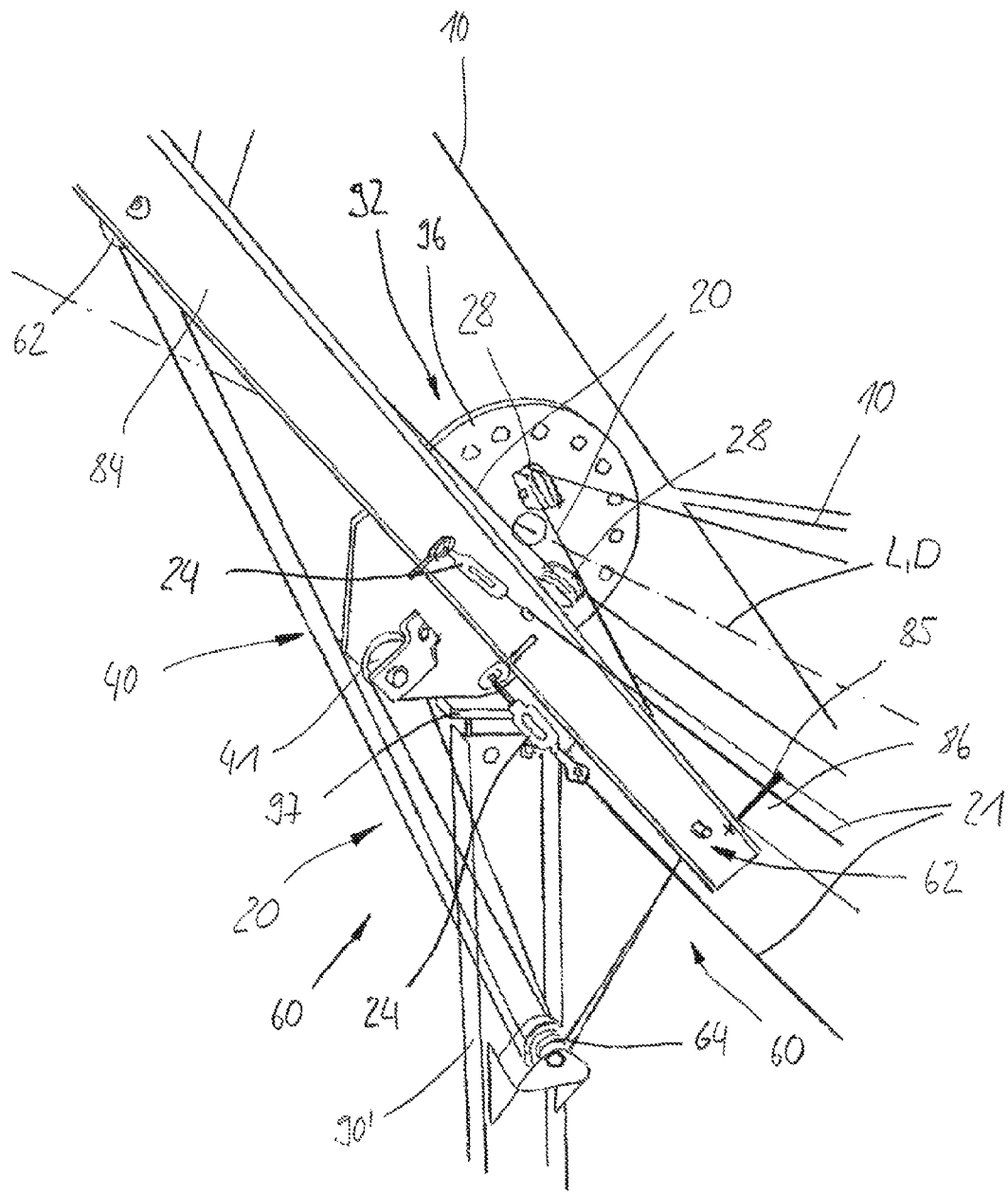
FIG. 5: shows a perspective view of preferred embodiments of two first base arrangements

FIG. 5 shows a perspective view of preferred embodiments of two first base arrangements 60 which are connected via a cross beam 84 to a drive element 92. The drive element 92 is concealed in FIG. 5 by a transmission element 96. The transmission element 96 serves to transmit the torque from the drive element 92 onto the cross beam 84. The transmission element 96 has a hole (without reference number) which lies in the region of a longitudinal axis L or an axis of rotation D. Furthermore the transmission element 96 has two deflecting rollers 28 which serve to guide the tension elements 20 along the longitudinal axis L or axis of rotation D starting from deflecting elements 62. Thus, both first base arrangements 60 on both sides of the longitudinal axis L each have the tension element 20 which is guided by the deflecting elements 62 to a fixed point 64 which is located on a main post 90'. From the fixed point 64 the tension elements 20 are guided to the compensating element 41 of a compensating arrangement 40 in order to be guided from there back via the fixed point 64 to the respective deflecting elements 62, and from there to the respective deflecting rollers 28. The drive element 92 is attached to the main post 90' via a support structure 97. Preferably the support structure 97 has oblong holes 95 by which means it is fixed to the main post 90' in order to ensure a height variability of the drive element 92. However, the oblong holes 95 are covered in FIG. 5. Further shown is a longitudinal member 86 which is fixed by means of a fastening element 85 (designed as a U clip in a preferred embodiment) on the cross beam 84, for example, by means of screws or the like. Two auxiliary cables 21 are further indicated which are each arranged on the cross beam 84 via tensioning element 24. Further schematically depicted are two solar modules 10 which so to speak describe an assembly plane E (not shown) which can be pivoted about the axis of rotation D.

Figure 6:
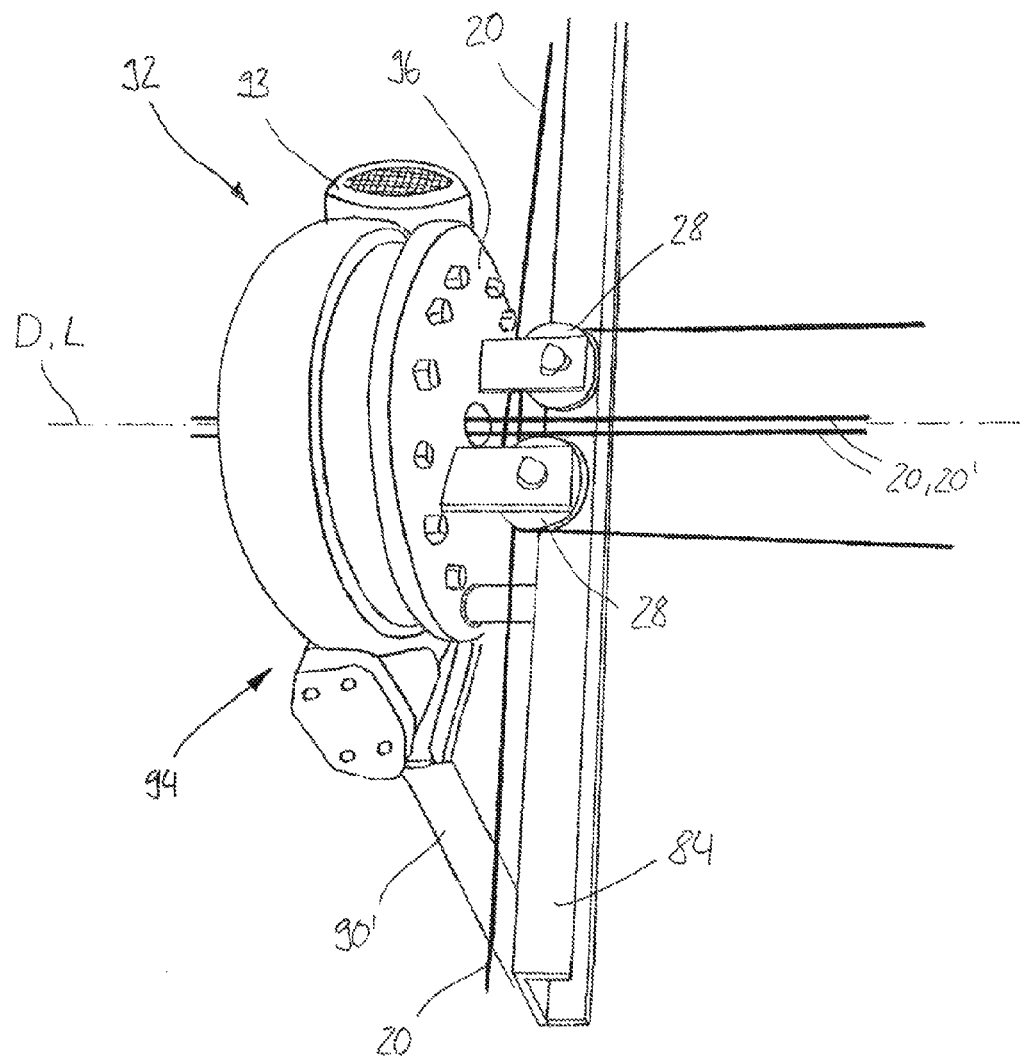
FIG. 6: shows a perspective view of a preferred embodiment of a drive element.

FIG. 6 shows a perspective plan view of a preferred embodiment of a drive element 92 comprising an electric motor 93 and a transmission 94. The drive element 92 is fastened on a main post 90'. From the drive element 92 a torque is transmitted via a transmission element 96 to a cross beam 84. Two deflecting rollers 28 are attached to the transmission element 96 which serve to guide two tension elements 20, which each pertain to first base arrangements 60 (not shown), further along a longitudinal axis L. Furthermore the transmission element 96 and the drive element 92 have a hole (without a reference number) through which tension elements 20 or further tension elements 20' can be guided. In particular, the further tension elements 20' can be those which, starting from a distributor element 22, are guided via deflecting rollers 28 again onto the other side of the main post to deflecting elements 62 or cross beams 84 located there, as shown in FIG. 2a.

Figure 7:
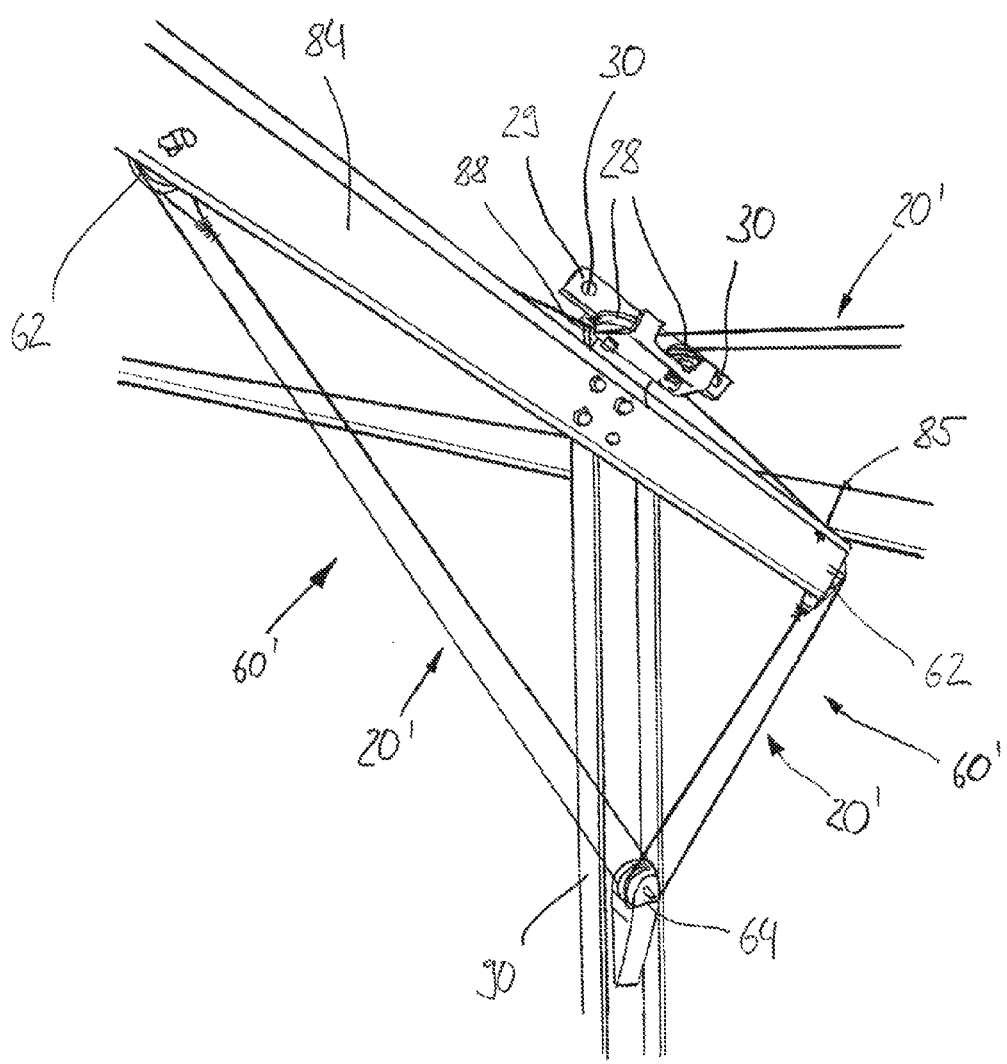
FIG. 7: shows a preferred embodiment of a post with two base arrangements.

FIG. 7 shows a preferred embodiment of a post 90 with second base arrangements 60'. Here a fixed point 64 is located on a post 90. A top part 88 is located at an upper end of the post 90. This is however almost completely concealed in FIG. 7. An adapter plate 29 with two recesses 30 is shown on the top part 88. The adapter plate 29 also has two deflecting rollers 28 which are designed to guide further tension elements 20' (coming from a longitudinal direction) in the direction of the deflecting elements 62 which are located on both sides of a cross beam 84. In the second base arrangements 60' the further tension element 20' is therefore guided coming from the deflecting roller 28 to the deflecting element 62 in order to be guided from there via the fixed point 64 and back again to the deflecting element 62 where it is then ultimately fixed. The adapter plate 29 also has oblong holes 85 which serve to fasten the cross beam 84 variably. The oblong holes 95 are however concealed in FIG. 7.

Figure 8:
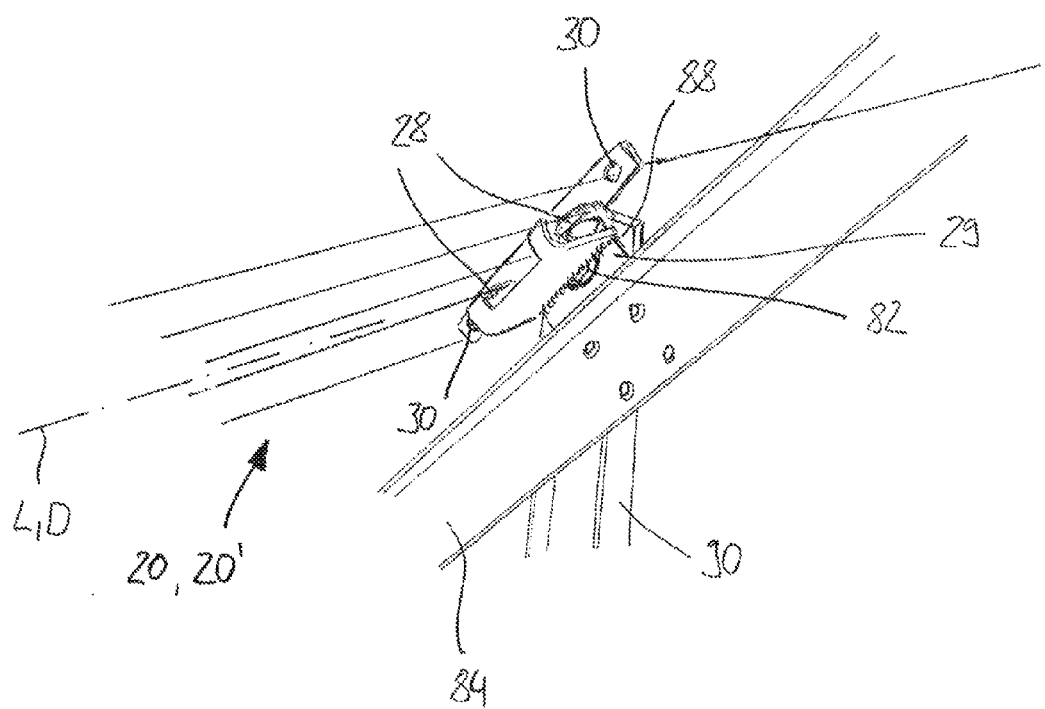
FIG. 8: shows a preferred embodiment of deflecting rollers for deflecting tension elements or further tension elements.

FIG. 8 shows a preferred embodiment of deflecting rollers 28 for deflecting tension elements 20 or further tension elements 20' along a longitudinal axis L or an axis of rotation D. A top part 88 is located on a post 90 on which an adapter plate 29 is again arranged. In the preferred embodiment shown a cross beam 84 is fixed by means of four screws on the adapter plate 29. For this purpose the adapter plate 29 has four oblong holes 95 (concealed) in order to arrange the cross beam 84 variably on the adapter plate 29. Here variably means that a height adjustment is possible along a vertical axis of the post 90 when the cross beam 84 is horizontal. Located between the top part 88 and the adapter plate 29 is a pivot point 82 configured as a bearing to enable a rotation of the cross beam 84 about the axis of rotation D. The adapter plate 29 has recesses 30 in order, for example, to guide tension elements 20 or further tension elements 20' along the longitudinal axis L. Furthermore two deflecting rollers 28 are fastened to the adapted plate 29 to deflect tension elements 20 or 20' for example by 180°.

Figure 9:
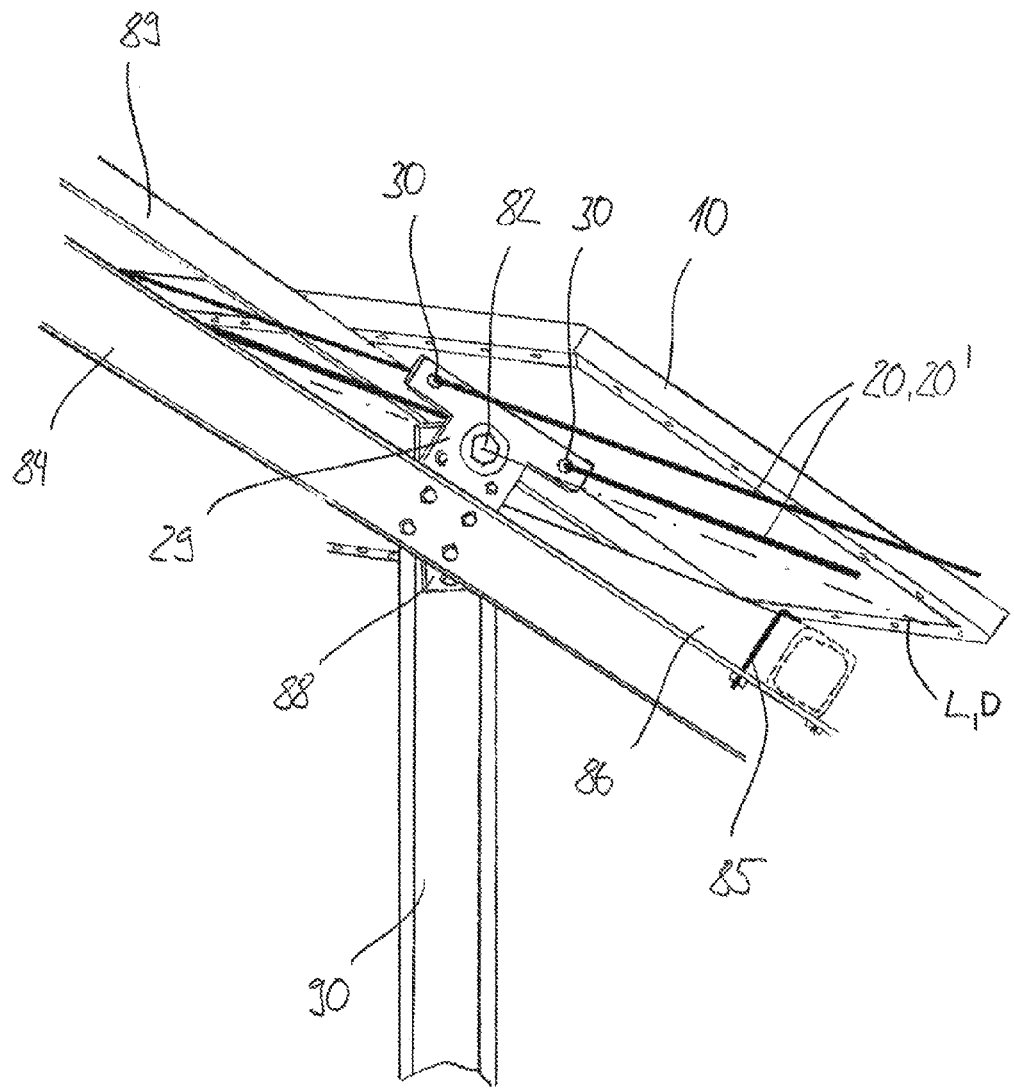
FIG. 9: shows a preferred embodiment of a post without first or second base arrangements.

FIG. 9 shows a preferred embodiment of a post 90 without first 60 or second base arrangements 60'. A top part 88 on which an adapter plate 29 is again arranged is fastened to the post 90. Furthermore, a cross beam 84 is located on the adapter plate 29 on which a longitudinal member 86 is attached by means of a fastening element 85. It is understood that such a longitudinal member 86 is preferably arranged on both sides of the adapter plate 29. For clarity however this is not shown here. Located on the longitudinal member 86 is a model carrier rail 89 on which a solar module 10 is in turn located. The arrangement consisting of the solar module 10, the module carrier rail 89, the longitudinal member 86 and the cross beam 84 gives the entire assembly plane E. The adapter plate 29 has two recesses 30 in order to guide tension elements 20 or further tension elements 20' further along a longitudinal axis L.

Figure 10:
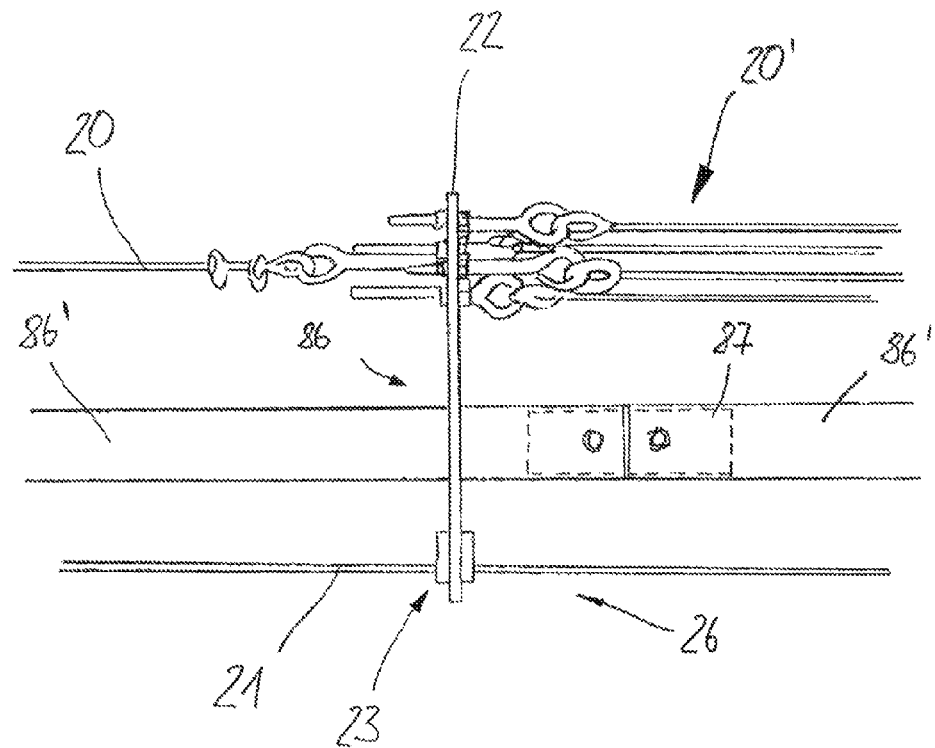
FIG. 10: shows a preferred embodiment of a distributor element.

FIG. 10 shows a preferred embodiment of a distributor element 22. The distributor element 22 is configured in a preferred embodiment as a plate on which a tension element 20 is arranged. Opposite the arrangement side of the tension element 20 further tension elements 20' are attached which thus form an extension of the tension element 20 or pass on the tension applied to this. In the embodiment shown the tension elements 20' are screwed into the plate of the distributor element 22 with threaded rods, whereby the tension elements 20' can be tensioned. Thus the distributor element 21 here functions as tensioning element 24. The distributor element 22 comprises a guide hole 23 through which an auxiliary cable 21 is guided. Further depicted are two longitudinal member parts 86' which are connected via an intermediate piece 87 so that a longitudinal member 86 is formed.

Figure 11:
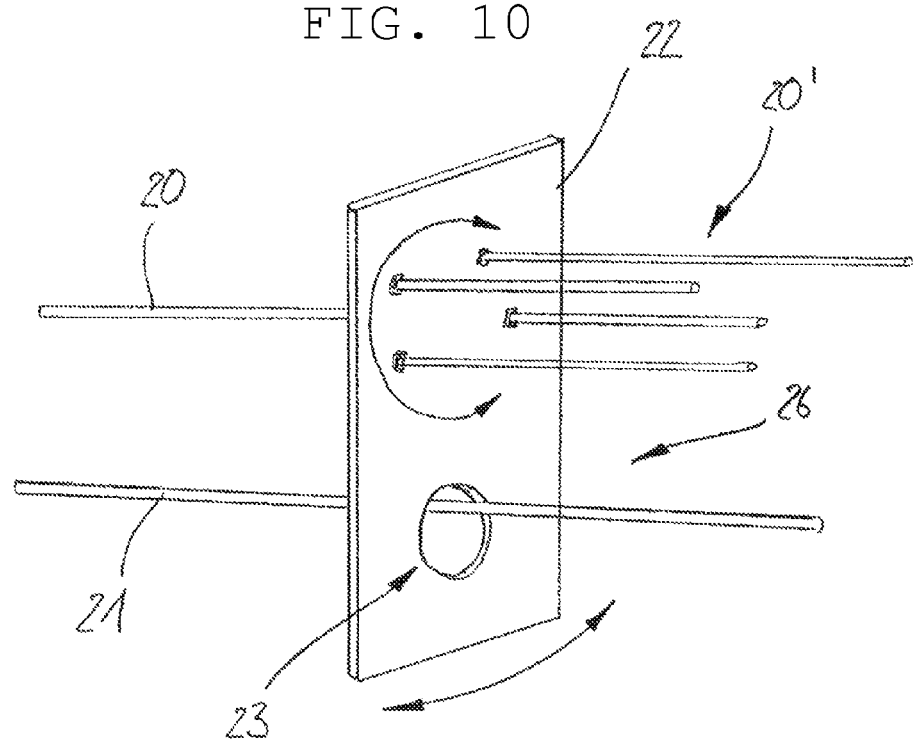
FIG. 11: shows a schematic diagram for the operating mode of an anti-twist device.

FIG. 11 shows a schematic view of the operating model of an anti-twist device 26. On the distributor element 22 a tension element 20 is located on one side and further tension elements 20' are located on the other side. The arrangement of the further tension elements 20' can have the result that a torque (cf. circular upper arrow in FIG. 11) is applied to the distributor element 22. The distributor element 22 further has a guide hole 23 which acts together with the distributor element 22 as an anti-twist device 26. An auxiliary cable 21 is guided through the guide hole 23. This is tensioned in such a manner that it is not movable or is only slightly movable. The torque depicted above is therefore received by the auxiliary cable 21 combined with the guide hole 23. That is, the distributor element 22 can only move to and from in a limited range (cf. double arrow). A twisting of the further tension elements 20' or the distributor element 22 is thus prevented.

REFERENCE LIST

10 Solar module
20 Tension element
20' Further tension elements
21 Auxiliary cable
22 Distributor element
23 Guide hole
24 Tensioning element
26 Anti-twist device
28 Deflecting roller
29 Adapter plate
30 Recess
40 Compensating arrangement
41 Compensating element
42 Second distance
42L Second distance, lengthened
60 First base arrangement
60' Second base arrangement
61 First distance
61L First distance, lengthened
61V First distance, shortened
62 Deflecting element
64 Fixed point
80 Movably mounted element
82 Pivot point
84 Cross beam
85 Fastening element
86 Longitudinal member
86 Longitudinal member part
87 Intermediate piece
88 Top part
89 Module carrier rail
90 Post
90' Main post
92 Drive element
93 Motor, electric motor
94 Transmission, worm gear
95 Oblong hole
96 Transmission element
97 Support structure
D Axis of rotation
E Assembly plane
L Longitudinal axis
ΔL Length difference
a Distance
R Radius

The invention claimed is:

1. An arrangement for pivoting an elongate assembly plane extending along a longitudinal axis about an axis of rotation oriented along the longitudinal axis, the arrangement comprising:
   a stabilizing system, a first one tension element, at least one post, at least one cross beam mounted on the post, and at least two base arrangements;
   wherein the stabilizing system comprises a first base arrangement having a deflecting element which is fixed on the assembly plane spaced apart from the axis of rotation to one side;
   wherein the stabilizing system further comprises a second base arrangement having a deflecting element which is fixed on the assembly plane spaced apart from the axis of rotation to another side;
   wherein the first and the second base arrangement are offset with respect to one another along the longitudinal axis;
   wherein in the base arrangements at least one of the first tension element and a second tension element connected to the first tension element is guided from the deflecting element to a fixed point and back at a first distance;
   wherein the at least one post includes a row of posts being arranged along the longitudinal axis, wherein cross beams are arranged along the longitudinal axis, wherein the cross beams include the assembly plane, wherein the cross beams are connected by at least one longitudinal member, wherein solar modules can be arranged either directly or indirectly on the assembly plane, wherein the cross beams are each at least one of indirectly and directly connected to a post of the row of posts via pivot points aligned along the axis of rotation, and wherein the at least two base arrangements are each arranged on a cross beam and the post to which the cross beams are each indirectly or directly connected to;
   wherein a main post of the row of posts comprises a drive element that pivots the cross beam of the main post and the assembly plane about the longitudinal axis;
   wherein at least one of the first tension element and the second tension element is guided between the base arrangements alongside the longitudinal axis, whereby a tension can be built up between the base arrangements; and
   wherein the assembly plane is stabilized by transmitting and distributing any forces which occur on the assembly plane along the at least one of the first tension element and the second tension element by the tension between the base arrangements.

2. The stabilizing system according to claim 1, wherein the at least one first tension element comprises a cable arrangement.

3. The stabilizing system according to claim 2, wherein the at least two base arrangements are connected by at least one of the first tension element and the second tension element in such a manner that in the case of a pivoting of the assembly plane the first distance of one of the at least two base arrangements is shortened when the first distance of the remaining of the two base arrangements is lengthened, wherein the shortening and the lengthening are different in such a manner that a length difference is formed which influences the tension of at least one of the first tension element and the second tension element wherein the stabilizing system comprises a compensating arrangement, and wherein the compensating arrangement is attached to the first base arrangement and comprises a compensating element which is arranged rotationally fixed with respect to the assembly plane, wherein the tension element is guided from the fixed point of the first base arrangement further to the compensating element and back at a second distance so that the length difference can be compensated by means of a variation of the second distance, whereby the tension in the at least two base arrangements can be adjusted.

4. The stabilizing system according to claim 3, wherein at least one of the deflecting element, the compensating element and the fixed point each comprise at least one deflecting roller, and wherein the at least one deflecting roller comprises at least one guide groove.

5. The stabilizing system according to claim 1, wherein the deflecting elements are designed both for deflecting at least one of the first tension element and the second tension element, and also as at least one of the starting point and end point thereof.

6. The stabilizing system according claim 1, wherein the compensating element is arranged at substantially right angles to the assembly plane from the axis of rotation at a third distance.

7. The stabilizing system according to claim 6, wherein the first tension in the at least two base arrangements is variable by means of the third distance between the compensating element and the axis of rotation.

8. The stabilizing system according to claim 1, wherein the first tension element is connected to a plurality of second base arrangements wherein the second tension element is one a plurality of second tension elements, whereby a distributor element on which the plurality of the second tension elements are arranged is provided on the first tension element which is connected to the first base arrangement, wherein the plurality of second tension elements lead to a plurality of second base arrangements, which are spaced apart from one another along the longitudinal axis.

9. The stabilizing system according to claim 8, wherein the distributor element comprises an anti-twist device.

10. The stabilizing system according to claim 8, wherein the distributor element comprises a plate on which the first tension element is attached on one side and the second tension elements are attached on the other side, and wherein the plate comprises a guide hole through which an auxiliary cable is guided in such a manner that a twisting of the plate about the longitudinal axis is prevented whereby the anti-twist device is provided.

11. The stabilizing system according claim 10, wherein at least one of the first tension element, the second tension element and the auxiliary cable comprise at least one spring element.

12. The stabilizing system according to claim 8, wherein the drive element comprises a motor and a transmission wherein a torque of the drive element is transmitted via a transmission element to a movable element, and wherein the compensating element is arranged at the transmission element.

13. The stabilizing system according to claim 12, wherein the transmission comprises a worm drive.

14. The stabilizing system according to claim 1, wherein the fixed points are arranged on at least one of the main post and the posts on which one of the at least two base arrangements is arranged.

15. The stabilizing system according to claim 1, wherein the stability system comprises a tracking device for solar modules.

* * * * *